Sept. 30, 1958 J. ROMEO 2,853,826
AUDIBLE FISHING LURE
Filed Sept. 9, 1957
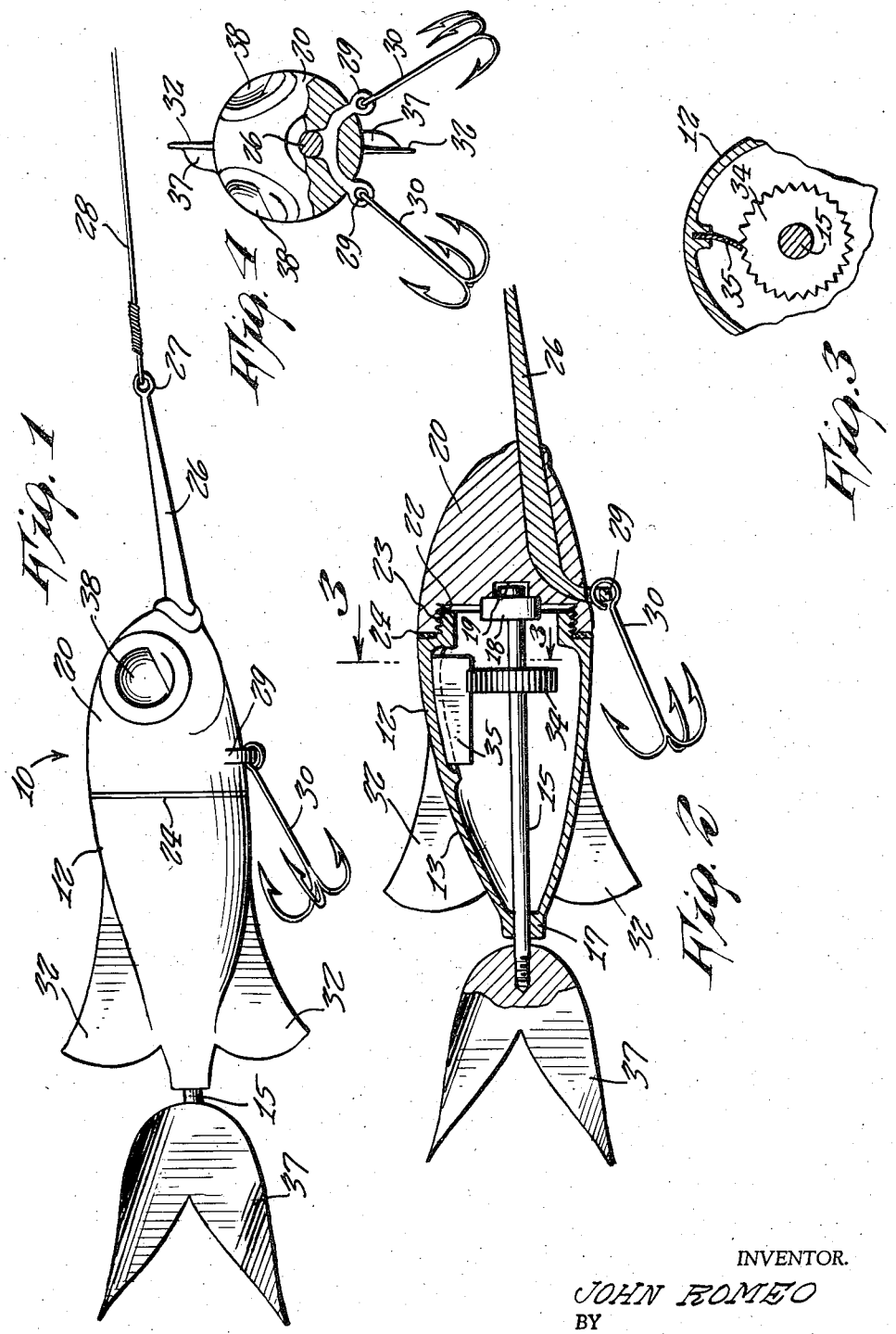
INVENTOR.
JOHN ROMEO
BY
Carl Miller
ATTORNEY

United States Patent Office 2,853,826
Patented Sept. 30, 1958

2,853,826

AUDIBLE FISHING LURE

John Romeo, Brooklyn, N. Y.

Application September 9, 1957, Serial No. 682,817

4 Claims. (Cl. 43—42.31)

This invention relates to fishing tackle and more particularly to a fishing lure.

It is well known that fish are attracted to moving and audible objects in the water. Accordingly, it is an object of the present invention to provide a fishing lure that employs both animated and audible elements so as to provide an attraction for fish.

A further object of the present invention is to provide an audible fishing lure of the type described which includes a tail unit that is automatically rotated in response to movement of the fishing lure through water, which rotating tail assembly is operative to actuate an audible signal which produces a continuous buzzing sound and vibration within the lure and within the immediate surrounding water area.

Still another object of the present invention is to provide a fishing lure having audible and animated means which can be manufactured in large quantities at a relatively low cost.

All of the foregoing and still further objects and advantages of this invention will become apparent from a study of the following specification, taken in connection with the accompanying drawing, wherein:

Figure 1 is a side elevational view of a fishing lure made in accordance with the present invention;

Figure 2 is a longitudinal cross sectional view of the device shown in Figure 1;

Figure 3 is a transverse cross sectional view taken along line 3—3 of Figure 2; and Figure 4 is a front elevational view, with parts broken away, of the fishing lure shown in Figure 2.

Referring now to the drawing, and more particularly to Figure 1 thereof, a fishing lure 10 made in accordance with the present invention is shown to include a main body portion 12 that defines an interior hollow housing 13. A longitudinal shaft 15 is rotatably supported within the housing 13 by means of a tail bearing 17 and a front bearing 18 that fits within a recess 19 of the head portion 20. This head portion 20 is provided with an internally threaded section 22 which receives a similarly threaded male stud portion 23 of the main body section 12. A circular gasket 24 provides a water tight seal between the main body portion 12 and the front section 20 so as to prevent water from leaking into the operating mechanism.

A pointed beak 26 having an eye 27 at one outer end provides means for securing a trolling line thereto. A pair of eyes 29 along the bottom edge of the front section 20 provide means for fastening the gang hooks 30 thereto, as is more clearly shown in Figure 2. A pair of fin stabilizers 32 lying in a single plane extend from opposite sides of the main body portion 12 so as to maintain the main body and front sections of the lure in a proper upright position during use.

The rear extremity of the rotatable shaft 15 supports a tail assembly 37 having a pair of rearwardly extending curved fins that are adapted to react against the fluid through which the lure is moved to impart rotation to the shaft 15. A ratchet wheel 34 is mounted upon the shaft 15 and is in engagement with a metal plate 35 that is secured within the housing 13. Thus, as the tail assembly 37 effects rotation of the shaft 15, the ratchet wheel 34 engages the metal plate 35, thereby producing an audible signal within the lure and within the surrounding area of the fluid medium through which the lure is propelled.

It will be recognized that this lure can be constructed of substantially any desired material such as plastic, bronze, and the like. Any additional features may also be applied thereto, such as eyes 38 so as to produce a substantially authentic and natural appearance.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An audible fishing lure comprising, in combination, a main body portion defining a central housing, a shaft rotatably supported within said housing, means for securing a line to said main body portion, stabilizing means carried by said main body portion, a tail secured to said shaft for rotation therewith, and audible means carried by said housing for actuation in response to rotation of said shaft, said stabilizing means comprising substantially straight fins lying in a single plane, said tail including a pair of curved extensions imparting rotation to said shaft in response to movement thereof through a fluid medium, said audible means comprising a ratchet wheel secured to said shaft, and a plate fixed at one end to said main body portion in engagement with said ratchet wheel.

2. An audible fishing lure as set forth in claim 1 wherein said plate is secured entirely within said housing.

3. An audible fishing lure as set forth in claim 2, wherein said main body portion includes a forwardly extending threaded male stud member, and a head portion defining an internally threaded section threadingly engaged with said threaded stud portion.

4. An audible fishing lure as set forth in claim 3, further comprising a fish hook pivotally supported upon said removable head portion on each side of said single plane of said stabilizing fins.

References Cited in the file of this patent

UNITED STATES PATENTS

| Number | Name | Date |
|---|---|---|
| 798,836 | Sherbrook | Sept. 5, 1905 |
| 974,050 | Garrison | Oct. 25, 1910 |
| 1,068,908 | Lane | July 29, 1913 |
| 1,693,140 | Dietze | Nov. 27, 1928 |
| 2,065,337 | Lee | Dec. 22, 1936 |
| 2,320,145 | La Due | May 25, 1943 |
| 2,550,988 | Flournoy | May 1, 1951 |